J. G. MARTINEZ.
FRUIT PICKER.
APPLICATION FILED AUG. 11, 1917.
1,319,407.
Patented Oct. 21, 1919.
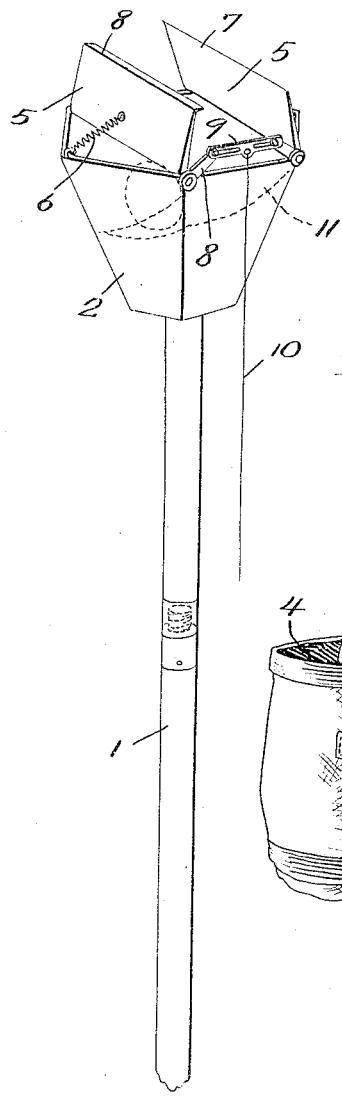
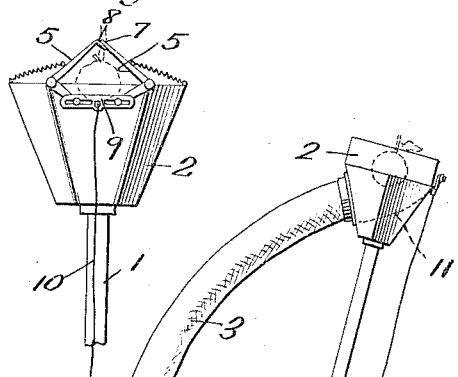
WITNESSES
INVENTOR
Jose Garcia Martinez
BY
ATTORNEY

UNITED STATES PATENT OFFICE.

JOSE GARCIA MARTINEZ, OF HARRISON, NEW JERSEY.

FRUIT-PICKER.

1,319,407. Specification of Letters Patent. Patented Oct. 21, 1919.

Application filed August 11, 1917. Serial No. 185,685.

*To all whom it may concern:*

Be it known that I, JOSE GARCIA MARTINEZ, a citizen of Spain, residing at Harrison, in the county of Hudson and State of New Jersey, have invented certain new and useful Improvements in Fruit-Pickers, of which the following is a specification.

This invention relates to fruit pickers adapted to sever the fruit and to convey the same to a container without in any way injuring the fruit.

An object of the invention is to provide a very simple fruit severing apparatus which is carried and operated by a person beneath the tree to effectively sever the fruit without injuring the latter or the tree.

The above and other objects and advantages of this invention will be in part described, and in part understood from the following description of the present preferred embodiment, the same being illustrated in the accompanying drawings, in which:

Figure 1 is a perspective view of a fruit picker constructed in accordance with my invention, a portion of the supporting rod and cable being broken away.

Fig. 2 is a similar view of the same illustrating the application of the device, and Fig. 3 is a fragmentary elevational view of the device showing the cutting leaves in a closed position.

In the drawings a supporting staff or rod 1 is provided which may be made of wood, metal or any other suitable material and is constructed of a plurality of detachably connected sections. A plurality of these sections are provided, so that the length of the rod may be adjusted to conform to the height of the tree from which the fruit is to be picked.

The body or receptacle 2 is fixedly mounted on the uppermost of the sections of the rod 1, and is preferably of a polygonal six sided configuration which tapers toward the bottom thereof. A fruit conducting tube 3 communicates with the body 2 and terminates in a container 4, the latter being preferably carried on the person of the operator of the fruit picker.

A pair of fruit severing blades or leaves 5 are pivotally mounted in the upper end of the body 2 at the ends of opposite parallel edges and are normally held in an open position by coil springs 6. A coil spring is engaged with the top of each blade or leaf 5, and has the opposite end therefore engaged with an adjacent corner of the body 2. The inner margin of one of the blades 5 is beveled to provide a cutting edge 7, while the inner margin of the opposite blade is turned inwardly at right angles as indicated at 8. The free margin of said right angled portion is likewise beveled to provide a cutting edge which coöperates with the cutting edge 7 of the opposite blade. It will be noted that the axes of the blades 5 are arranged in such close proximity that the proximate edges of the blades will meet at a point above the upper end of the body 2 so as to insure effective severance of the fruit from the tree. It will be noted in Fig. 3 that the right angle portion 8 of one of the blades lies beneath the free marginal edge of the opposite blade and in close contact thereby severing even the very smallest twig upon which the fruit might be suspended, although the bent edge 8 may at times lie above the edge 7 since a cutting operation will be effected in either instance.

A lever or arm 8 is fixedly engaged with each of the blades 5 whereby movement of said levers will cause simultaneous movement of the blades 5. The free ends of said levers are connected by a cross-bar 9, the latter having elongated slots formed therein which receive pintles carried by said levers 8. A cable 10 is engaged with said bar 9 and is adapted to be held in the hand of the operator as shown in Fig. 2 of the drawing, so that the blades 5 may be operated against the resistance of said springs 6, at the option of the operator.

In operation, it is preferable that the container 4 be strapped about the body of the operator, the latter being equipped with a belt which supports adjustable sections of the supporting rod 1 and is likewise adapted to support the rod 1 when the latter is in operation. Assuming that the blades of the picker are in open position as shown in Fig. 1, the fruit is introduced between the blades, pursuant to which pressure is exerted on the cable 10 causing the blades 5 to come together in the position shown in Fig. 3, thereby severing the fruit and causing the latter to fall upon a false bottom 11. The false bottom 11 inclines toward the tube 3 so that the fruit will be conducted directly into the tube 3 and will pass through the latter into the receptacle 4. Just as soon as pressure is released from the cable 10 the blades 5, actuated by the springs 6, will be moved to an open position limited by engagement of the pintles in the outer ends of the slot in bar 9, thereby permitting successive operations of the blades for severing the fruit.

It will be noted that owing to the hexagonal configuration of the receptacle and the fact that the pivoted edges of the blades are extended across the receptacle from opposite corners in parallelism, a square aperture is defined between the blades which is sufficiently large to receive the fruit, while the mouth of the receptacle is larger, thereby permitting the reception therein of a number of pieces of fruit before it becomes necessary to manipulate the device to expel the fruit through the conduit. At the same time the corners provide a means to which to attach the springs 6.

It will be understood that the above description and accompanying drawings comprehend only the general and preferred embodiment of my invention and that various minor changes in details of construction, proportion and arrangement of parts may be made within the scope of the appended claims without sacrificing any of the advantages of my invention.

I claim:

1. In a fruit picker, a pair of cutter elements pivotally mounted for movement toward and away from each other, an arm carried by each element, a laterally extending pin on the free end of each arm, a slotted bar to receive the pins, means for moving the bar in a direction transversely of its length to bring the elements toward each other, and resilient means acting normally to retain the elements in separated relation.

2. A fruit picker including a six sided tapering receptacle, a pair of cutter blades pivotally mounted at the ends of opposite parallel edges of the mouth of the receptacle, coiled springs connecting each blade with an adjacent corner of the receptacle to normally retain the blades in separated relation, a conduit leading from the inside of the receptacle, an arm carried by each blade, said arms being directed toward each other, a laterally extended pin carried by the free end of each arm, a bar having a slot at each end to receive the pins, and a flexible element connected to the medial portion of the bar.

In testimony whereof I affix my signature in presence of two witnesses.

JOSE GARCIA MARTINEZ.

Witnesses:
JUAN CABALLERI GUITIERREZ,
HENRY BOSSET.

Copies of this patent may be obtained for five cents each, by addressing the "Commissioner of Patents, Washington, D. C."